United States Patent
Lee

(10) Patent No.: US 8,998,230 B2
(45) Date of Patent: Apr. 7, 2015

(54) REAR SUSPENSION MOUNTING STRUCTURE FOR ELECTRIC VEHICLE

(71) Applicant: Hyundai Wia Corporation, Gyeongsangnam-do (KR)

(72) Inventor: Eun Chang Lee, Gyeonggi-do (KR)

(73) Assignee: Hyundai Wia Corporation, Gyeongsangnam-do (KR)

( * ) Notice: Subject to any disclaimer, the term of this patent is extended or adjusted under 35 U.S.C. 154(b) by 0 days.

(21) Appl. No.: 14/139,738

(22) Filed: Dec. 23, 2013

(65) Prior Publication Data

US 2014/0375011 A1    Dec. 25, 2014

(30) Foreign Application Priority Data

Jun. 21, 2013  (KR) .................. 10-2013-0071801

(51) Int. Cl.
- *B60G 3/12* (2006.01)
- *B60G 21/05* (2006.01)
- *B60K 1/00* (2006.01)
- *B60G 7/00* (2006.01)

(52) U.S. Cl.
CPC ..................................... *B60G 7/001* (2013.01)

(58) Field of Classification Search
USPC ........ 180/65.51, 65.6; 267/273; 280/124.116, 280/124.128, 124.13, 124.131, 124.153, 280/124.166; 301/6.5, 6.8
See application file for complete search history.

(56) References Cited

U.S. PATENT DOCUMENTS

| | | | |
|---|---|---|---|
| 6,059,314 A * | 5/2000 | Streubel et al. ............... 280/798 |
| 7,556,111 B2 * | 7/2009 | Oshidari .................... 180/65.51 |
| 7,651,153 B2 * | 1/2010 | Martin et al. ................. 296/155 |
| 7,673,719 B2 * | 3/2010 | Buschena ...................... 180/344 |
| 7,686,315 B2 * | 3/2010 | Kramer ................... 280/124.128 |
| 7,753,151 B2 * | 7/2010 | Marsh et al. ............... 180/65.51 |
| 7,832,749 B2 * | 11/2010 | Lee ......................... 280/124.116 |
| 7,862,059 B2 * | 1/2011 | Ko ........................... 280/124.116 |
| 7,975,790 B2 * | 7/2011 | Kim et al. ................. 180/65.51 |
| 7,988,165 B2 * | 8/2011 | Nishigaya .............. 280/124.131 |
| 8,220,808 B2 * | 7/2012 | Kim ....................... 280/124.107 |
| 2009/0032321 A1 | 2/2009 | Marsh et al. |
| 2012/0292978 A1 | 11/2012 | Buschjohann et al. |
| 2014/0015382 A1 * | 1/2014 | Kim ........................... 310/67 R |
| 2014/0138171 A1 * | 5/2014 | Mair et al. ...................... 180/55 |

FOREIGN PATENT DOCUMENTS

| | | | |
|---|---|---|---|
| FR | 2761304 | | 10/1998 |
| KR | 2002036517 A | * | 5/2002 |
| KR | 792910 B1 | * | 1/2008 |
| KR | 2008020056 A | * | 3/2008 |

(Continued)

*Primary Examiner* — Paul N Dickson
*Assistant Examiner* — Laura Freedman

(57) ABSTRACT

Provided is a rear suspension mounting structure for an electric vehicle, which can reduce the overall weight and can enhance steering stability by forming a torsion beam and a trailing arm using different materials. In one embodiment, the rear suspension mounting structure includes a hub fastened to the center of a wheel, a trailing arm including a housing producing an internal space and an arm bush extending to one side of the housing, a torsion beam bolt-coupled to the arm bush through a coupling plate, a motor coupled to the internal space of the housing and supplying a driving force, a motor cover provided in the internal space of the housing, and a driving speed reducer provided at the outside of the motor cover in the internal space of the housing, wherein the torsion beam and the trailing arm are formed using dissimilar metals.

20 Claims, 6 Drawing Sheets

(56) References Cited

FOREIGN PATENT DOCUMENTS

| | | |
|---|---|---|
| KR | 10-2010-0034222 | 4/2010 |
| WO | WO 2008-004715 | 1/2008 |
| WO | WO 2013-013920 | 1/2013 |

* cited by examiner

< Prior Art >

< Prior Art >

< Prior Art >

REAR SUSPENSION MOUNTING STRUCTURE FOR ELECTRIC VEHICLE

CROSS-REFERENCE TO RELATED APPLICATION

This application claims priority to and the benefit of Korean Patent Application No. 10-2013-0071801 filed on Jun. 21, 2013, which is herein incorporated by reference in its entirety.

BACKGROUND OF THE INVENTION

1. Field of the Invention

Aspects of the present invention relate to a rear suspension mounting structure for an electric vehicle.

2. Description of the Related Art

In general, a suspension system for vehicles absorbs vibration and impact transmitted from the wheels to the vehicle body during a movement of a vehicle, thus preventing damage to the vehicle body and freight caused by the vibration and impact, in addition to allowing passengers to feel comfortable. The suspension system includes a front suspension and a rear suspension.

In particular, in a four wheel drive (4WD) in-wheel electric vehicle, a rear suspension system is configured to directly transmit power to a wheel by a motor disposed within the wheel, unlike in a wheel rotating mode in which a wheel is rotated by power transmission through engine-mission-drive shaft in a gasoline or diesel automotive vehicle.

Therefore, when the in-wheel motor is employed, a power transmission device, such as differential gears, may not be provided, thereby reducing the vehicle weight and lowering an energy loss during power transmission.

FIG. 1 shows a conventional rear suspension for an electric vehicle, and FIGS. 2A and 2B shows a conventional rear suspension for a rear-wheel electric vehicle.

Referring to FIG. 1, the conventional rear suspension comprises a torsion beam 11, trailing arms 12, a spring sheet 13, a shock-absorber bracket 14 and a spindle bracket 15. The conventional rear suspension is configured such that the trailing arms 12 are directly welded to left and right ends of the torsion beam 11, and the spring sheet 13, the shock-absorber bracket 14 and the spindle bracket 15 are separately welded to the trailing arms 12. In addition, the torsion beam 11, the trailing arms 12, the spring sheet 13, the shock-absorber bracket 14 and the spindle bracket 15 are formed using steel metals.

Referring to FIGS. 2A and 2B, the conventional rear suspension for a rear-wheel electric vehicle largely includes a coupled torsion beam axle 21, a driving motor 22 and an axle assembly 23. The conventional rear suspension is configured such that the driving motor 22 is fastened to the coupled torsion beam axle 21 using bolts. Here, a housing of the driving motor 22 is fabricated using aluminum in consideration of the weight of the driving motor 22 and heat-emitting performance.

However, in the conventional rear suspension mounting structure for an electric vehicle, in order to add a driving motor to a coupled torsion beam axle, a separate fastening structure and additional space are required, which is disadvantageous in view of package utilization efficiency. In addition, the separate fastening structure and additional space increase an unsprung mass, which is disadvantageous in view of riding comfort and steering stability.

In addition, since the suspension of a torsion beam axle is basically designed to produce torsion to the central torsion beam, aluminum may be employed for the purposes of cooling the driving motor and improving packaging. In this case, however, it is difficult to achieve durability.

SUMMARY OF THE INVENTION

Aspects of the present invention provide a rear suspension mounting structure for an electric vehicle, which can reduce the overall weight and can enhance steering stability by forming a torsion beam and a trailing arm using different materials.

Other aspects of the present invention provide a rear suspension mounting structure for an electric vehicle, which can improve cooling performing of a driving motor of the electric vehicle by integrally forming a housing of the driving motor and a trailing arm, facilitates use of packages of the electric vehicle and can protect the driving motor using the integrated housing during rear-end collision.

In accordance with one aspect of the present invention, there is provided a rear suspension mounting structure based on a coupled torsion beam axle (CTBA) method includes a hub fastened to the center of a wheel to be rotatable, a trailing arm including a housing producing an internal space and an arm bush extending to one side of the housing and coupled to the vehicle body, a torsion beam bolt-coupled to the arm bush through a coupling plate, a motor coupled to the internal space of the housing and supplying a driving force, a motor cover provided in the internal space of the housing and sealing the motor from the outside of the housing, and a driving speed reducer provided at the outside of the motor cover in the internal space of the housing, coupled to the hub and reducing the output driving speed in a constant gear ratio, wherein the torsion beam and the trailing arm are formed using dissimilar metals.

The torsion beam may be made of a steel metal.

The trailing arm may be made of aluminum.

The coupling plate and the torsion beam may be made of steel metals.

The coupling plate may have a fastening groove formed therein. Here, the fastening groove may be shaped to correspond to an end of the torsion beam.

The torsion beam may be fitted into the fastening groove to be fastened.

A contact region between the fastening groove and the torsion beam is fastened by welding.

The coupling plate may be shaped of a planar plate.

A plurality of through holes may be formed in the coupling plate, a plurality of coupling holes corresponding to the plurality of through holes may be formed in one side surface of an arm bush to which the coupling plate is attached, and bolts penetrating the through holes and the coupling holes may be engaged with nuts from the other side surface of the arm bush.

The coupling holes may have the same horizontally sectional shapes as the nuts.

The nuts may be engaged with the bolts within the coupling holes.

The housing and the arm bush may be integrally formed with each other.

A cover may be installed at the exterior side of the housing in a direction in which the motor is coupled into the housing.

A vertically sectional shape of the arm bush of the trailing arm may be "I" shaped.

A vertically sectional shape of the arm bush of the trailing arm may be "H" shaped.

A surface on which the arm bush and the coupling plate are fastened with each other may be hermetically sealed.

As described above, in the rear suspension mounting structure for an electric vehicle according to the embodiment of the present invention, the overall weight can be reduced and steering stability can be enhanced by forming a torsion beam and a trailing arm using different materials.

In addition, compared to the conventional rear suspension, the rear suspension mounting structure for an electric vehicle according to the present invention has a simplified fastening structure, excellent space utilizing efficiency, thereby improving the degree of design freedom.

Further, according to the present invention, cooling performing of a driving motor of the electric vehicle can be improved by integrally forming the housing of the driving motor and the trailing arm, package utilization efficiency can be increased, and the driving motor can be protected by the integrated housing during rear-end collision.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings in such a manner that the technical idea of the present disclosure may easily be carried out by a person with ordinary skill in the art to which the invention pertains. Objects, operations, effects, other objects, characteristics and advantages of the present disclosure will be easily understood from an explanation of a preferred embodiment that will be described in detail below by reference to the attached drawings.

Although embodiments have been described with reference to illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Figure 1:
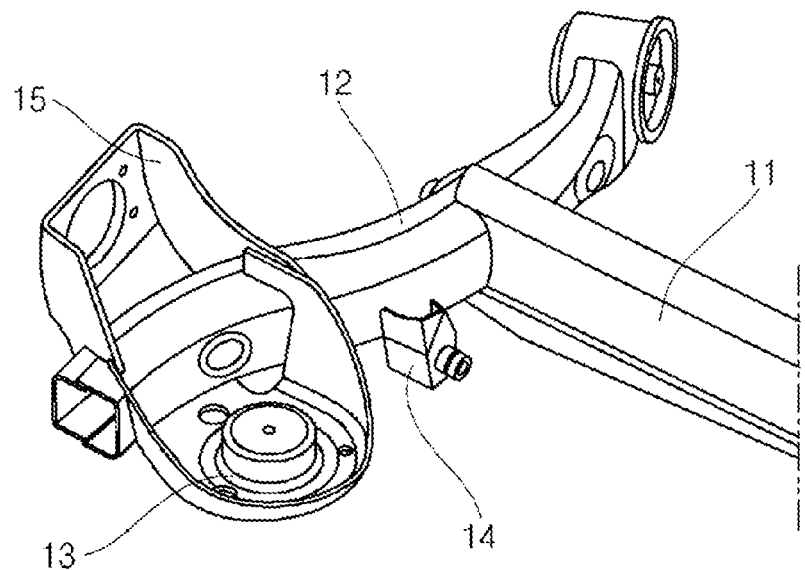
FIG. 1 shows a conventional rear suspension for an electric vehicle.
Figure 2A:
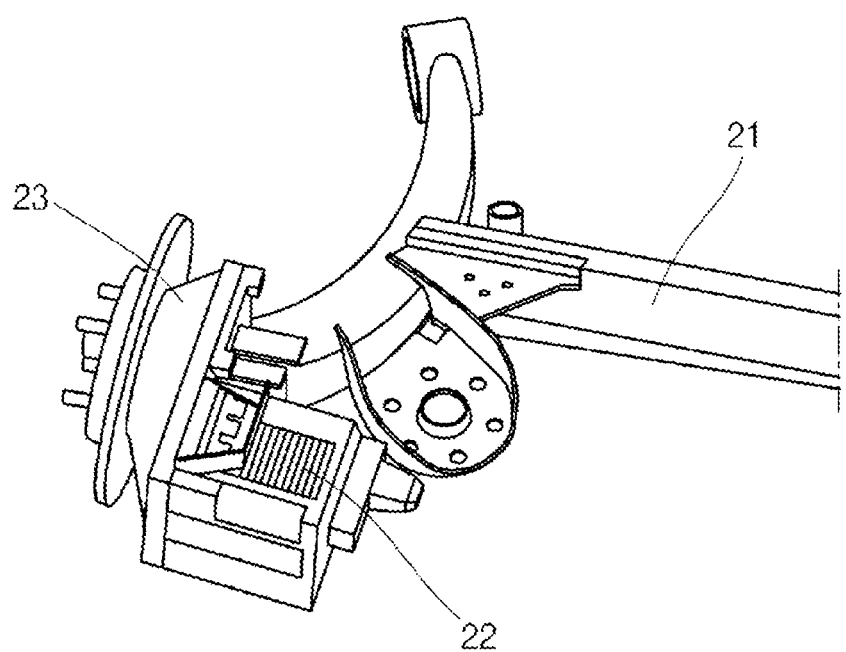
FIGS. 2A and 2B show a conventional rear suspension for a rear-wheel electric vehicle.
Figure 2B:
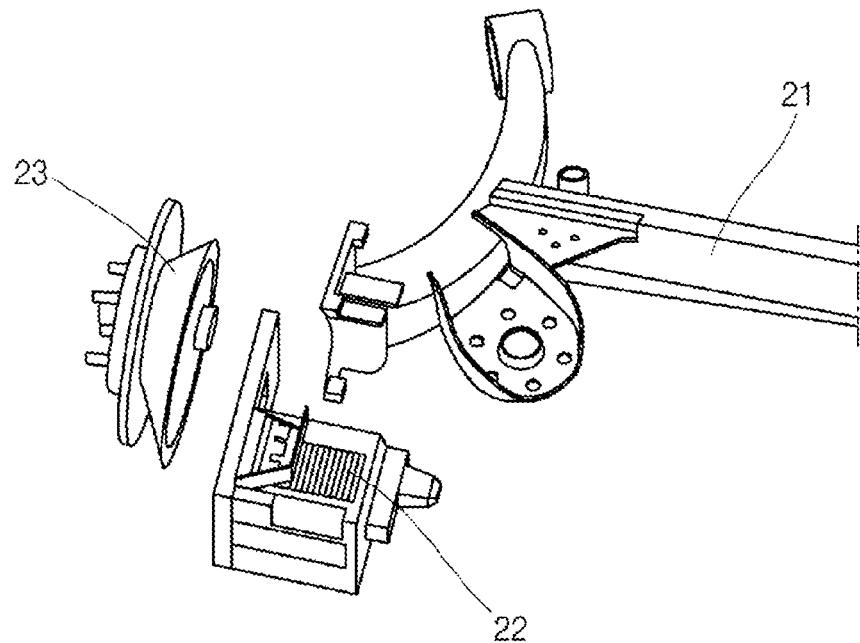
Figure 3A:
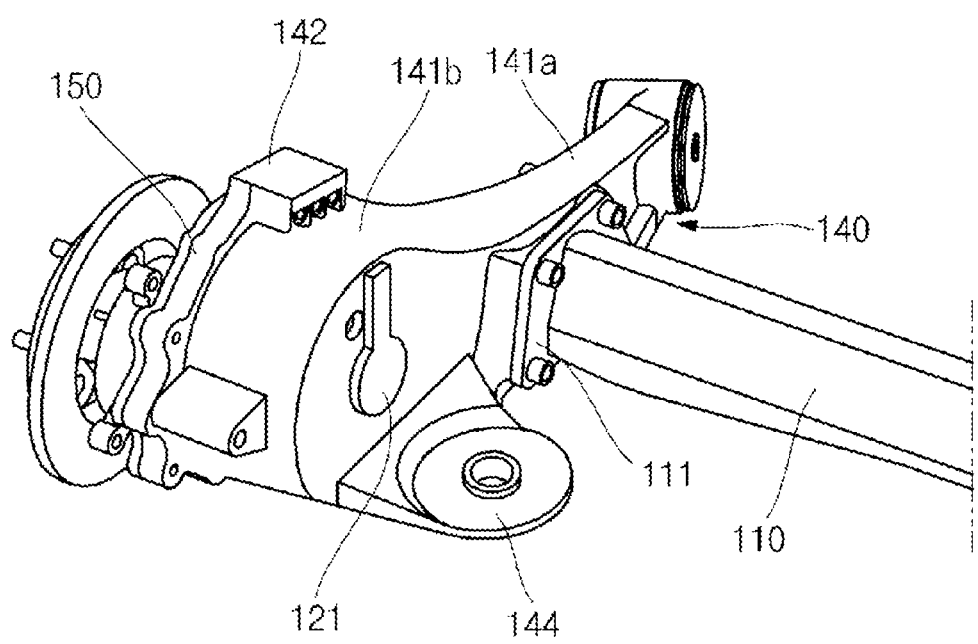
FIG. 3A is a perspective view of a rear suspension mounting structure for an electric vehicle according to an embodiment of the present invention.
Figure 3B:
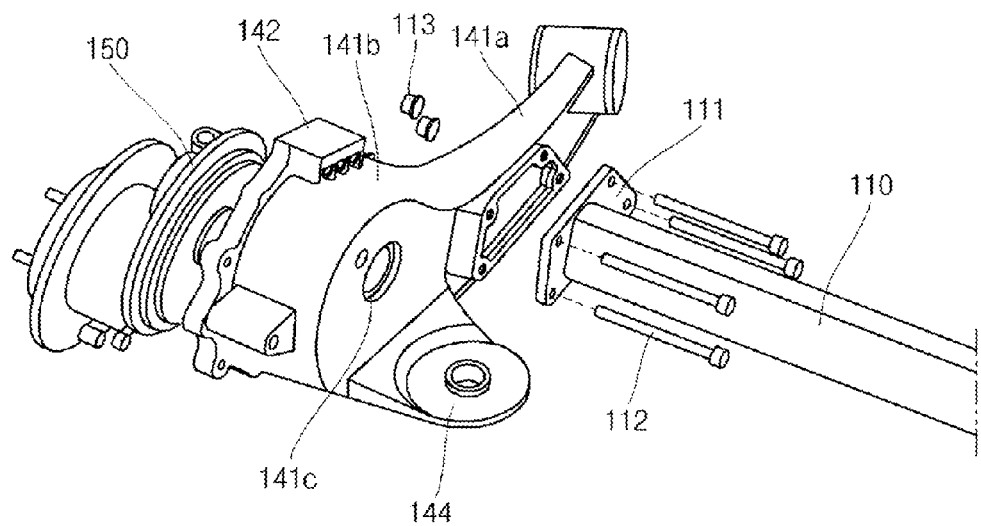
FIG. 3B is an exploded perspective view from one side of FIG. 3A.
Figure 3C:
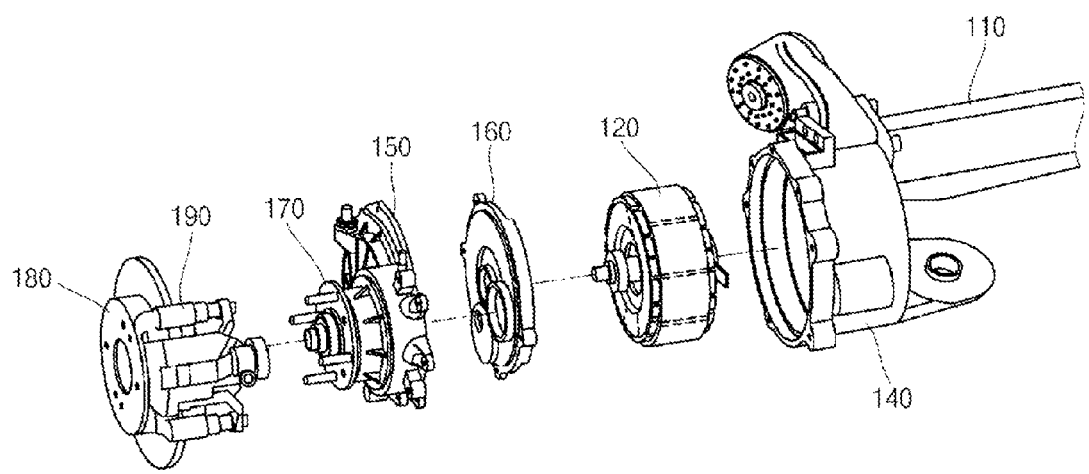
FIG. 3C is an exploded perspective view from the other side of FIG. 3A.
Figure 4A:
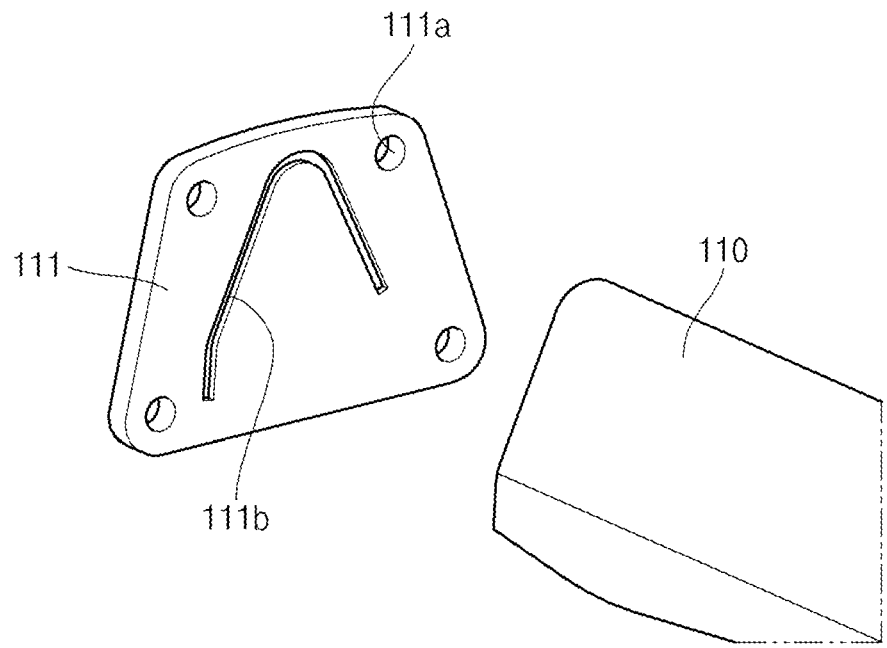
FIGS. 4A and 4B are perspective views illustrating structures before and after a trailing arm and a torsion beam are assembled with each other.
Figure 4B:
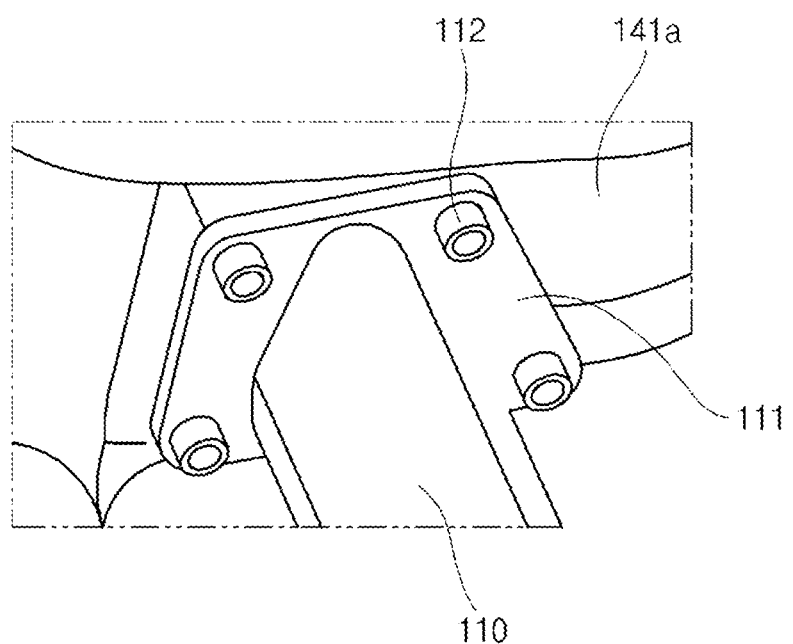
Figure 5A:
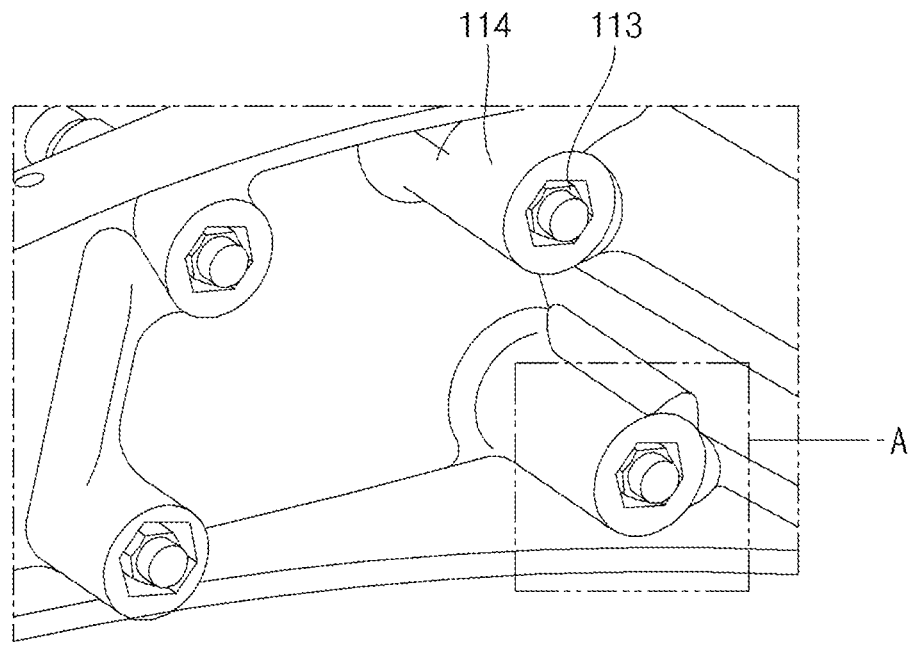
FIG. 5A is a perspective view illustrating a state in which a trailing arm and a torsion beam are assembled with each other.
Figure 5B:
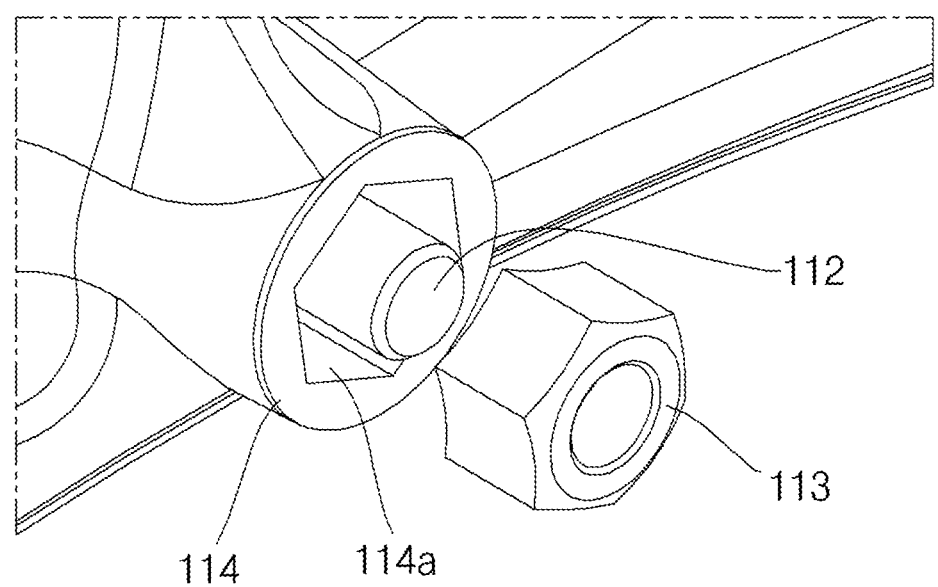
FIG. 5B is an enlarged perspective view illustrating a portion 'A' of FIG. 5A.
Figure 6:
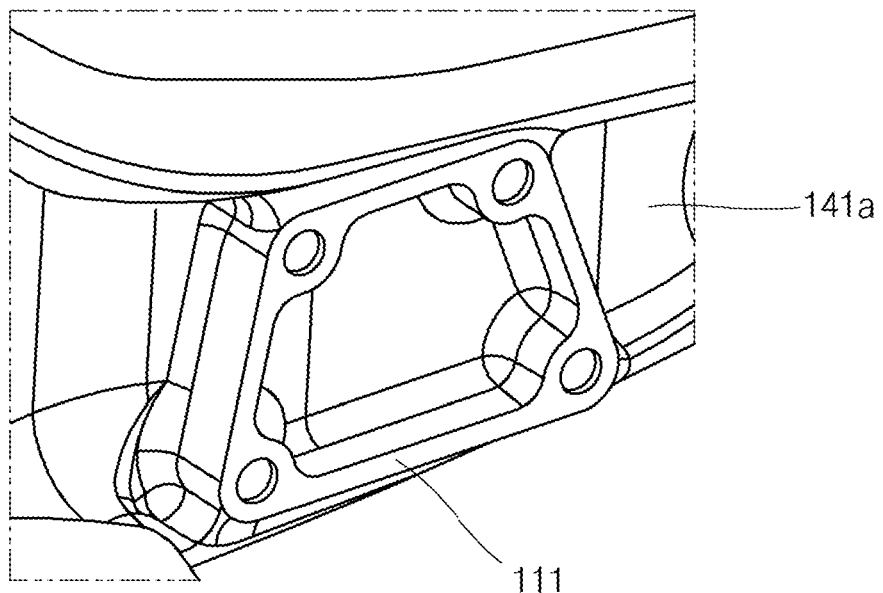
FIG. 6 is a side view illustrating a trailing arm before it is assembled with a torsion beam.
Figure 7:
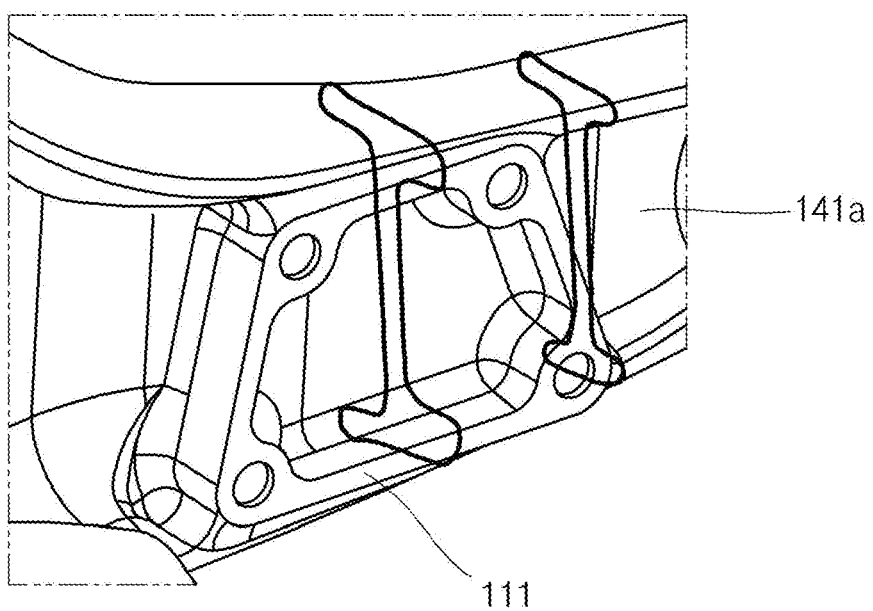
FIG. 7 is a side view illustrating a cross section of the trailing arm shown in FIG. 6.

FIG. 3A is a perspective view of a rear suspension mounting structure for an electric vehicle according to an embodiment of the present invention, FIG. 3B is an exploded perspective view from one side of FIG. 3A, and FIG. 3C is an exploded perspective view from the other side of FIG. 3A, FIGS. 4A and 4B are perspective views illustrating structures before and after a trailing arm and a torsion beam are assembled with each other, FIG. 5A is a perspective view illustrating a state in which a trailing arm and a torsion beam are assembled with each other, and FIG. 5B is an enlarged perspective view illustrating a portion 'A' of FIG. 5A, FIG. 6 is a side view illustrating a trailing arm before it is assembled with a torsion beam, and FIG. 7 is a side view illustrating a cross section of the trailing arm shown in FIG. 6.

Referring to FIGS. 3A to 3C, the rear suspension mounting structure for an electric vehicle according to an embodiment of the present invention is based on a coupled torsion beam axle (CTBA) method, and largely includes a wheel (not shown), a hub 170 fastened to the center of the wheel so as to be rotatable, a driving speed reducer 150 connected to the hub 170, a trailing arm 140 installed to corresponding to the driving speed reducer 150, and a motor 120 installed within the housing 141b of the trailing arm 140 and providing a driving force.

The driving speed reducer 150 includes a plurality of gears meshed with each other in a constant gear ratio and is connected to a driving shaft (not shown) penetrating and fastened to the hub 170 to reduce the output driving speed. A caliper 190 closely coupled to a disk 180 is coupled to the exterior side of the driving speed reducer 150. Since the driving speed reducer 150 has a state-of-art structure, a detailed description thereof will be omitted.

The trailing arm 140 includes a housing 141b having an internal space to mount a motor therein, and an arm bush 141a extending in one direction and coupled to the vehicle body.

Referring to FIGS. 4A and 4B, the arm bush 141a is coupled to a coupling plate 111 on one side surface.

To this end, a plurality of through holes 111a through which bolts 112 pass are formed in the coupling plate 111. In addition, coupling holes 114a corresponding to the plurality of through holes 111a are formed in one surface of the arm bush 141a, to which the coupling plate 111 is attached. Nuts 113 are engaged with the bolts 112 passing through the through holes 111a and the coupling holes 114a on the other surface of the arm bush 141a, so that the coupling plate 111 and the arm bush 141a are combined with each other.

Referring to FIGS. 5A and 5B, the coupling holes 114a are formed in protrusions 114 formed to allow the bolts 112 to pass through one surface of the arm bush 141a and the other surface opposite to the one surface of the arm bush 141a. Horizontally sectional shapes of the coupling holes 114a are the same as shapes of the nuts 113. Here, the nuts 113 are fitted into and fastened to ends of the bolts 112 in the coupling holes 114a. Therefore, in the present invention, the nuts 113 are fastened to the bolts 112 within the coupling holes 114a, thereby securing clearances between the arm bush 141a and other adjacent components, attaining an improved degree of freedom in designing products, and increasing the productivity through improvement of a fastening method.

As shown in FIGS. 6 and 7, a vertically sectional shape of the arm bush 141a coupled to the coupling plate 111 is "I" shaped. Although not shown, a vertically sectional shape of the arm bush 141a coupled to the coupling plate 111 is "H" shaped. In the present invention, by forming the arm bush 141a coupled to the coupling plate 111 to have an "I" shaped or "H" shaped vertical section, thereby reducing the overall weight of the product and attaining a stiffness reinforcing effect. In addition, a surface on which the arm bush 141a of the trailing arm 140 and the coupling plate 111 are fastened with each other is hermetically sealed.

In addition, a fastening groove 111b shaped to correspond to the end of the torsion beam 110 is formed in a region of the coupling plate 111 with which the torsion beam 110 is fastened. The fastening groove 111b is formed to have the same sectional shape as that of the end of the torsion beam 110. In the present invention, the fastening groove 111b is formed in the coupling plate 111, and the torsion beam 110 is fitted into the fastening groove 111b, followed by welding a contact region, thereby fastening the coupling plate 111 and the torsion beam 110 with each other.

Meanwhile, the coupling plate 111 is shaped of a planar plate, and may be fastened with the torsion beam 110 by being welded to the contact region between the coupling plate 111 and the torsion beam 110.

The housing 141b and the arm bush 141a may be integrally formed with each other. In addition, the trailing arm 140 is integrated into one end of the housing 141b (the left portion of the drawing) and includes a fastening part 142 fastened with the exterior part of the driving speed reducer 150, and a spring sheet 144 extending to the other side of the housing 141b and having a spring (not shown) installed therein. The housing 141b and the spring sheet 144 are integrally formed with each other.

The housing 141b has an internal space shaped of a hollow cylinder, and the motor 120 and the motor cover 160 are installed in the internal space of the housing 141b. The driving speed reducer 150 is coupled to the housing 141b or a separate motor housing (not shown) at the exterior side of the motor cover 160 to receive a driving force from the motor 120.

In addition, the housing 141b is formed to have opposite ends opened, open hole 141c formed on one side of the housing 141b (the right side of the drawing) is sealed by the cover 121, and the motor 120 in the housing 141b (the left side of the drawing) is sealed by the motor cover 160. Thereafter, the driving speed reducer 150 is coupled to the exterior side of the motor cover 160. Here, the motor cover 160 has an outer diameter smaller than an inner diameter of the housing 141b to completely fill the motor cover 160 into the interior side of the housing 141b and is coupled to the interior side of the housing 141b by a motor cover fastening bolt (not shown). Therefore, the internal space of the housing 141b is divided into an input side (corresponding to an installation region of the motor 120) and an output side (corresponding to an installation region of the driving speed reducer 150) by the motor cover 160.

In the present invention, the housing 141b functioning as a motor housing as well has increased heat capacity due to its increased volume. However, since aluminum has high heat conductivity, the cooling performance of the motor 120 is enhanced. In addition, the motor 120 is shifted from a rear side to a front side of the vehicle by the housing 141b made of aluminum, thereby improving ride comfort and steering stability through lever ratio.

The trailing arm 140 is assembled to opposite sides of a rear wheel and its middle portion is connected to the torsion beam 110, so that the opposite sides of the rear wheel is subjected to torsion stress when both rear wheels are actuated from side to side or back and forth in a staggered manner, thereby absorbing shocks.

Meanwhile, the torsion beam 110 and the trailing arm 140 are formed using dissimilar metals. In addition, the coupling plate 111 is made of a steel metal. In detail, the torsion beam 110 is made of a steel metal, and the trailing arm 140 is made of aluminum. Here, the torsion beam 110 is subjected to torsion, which may adversely affect the durability when the trailing arm 140 is made of aluminum. The steel metal has a density of approximately 7.8 g/cm$^3$, and aluminum has a density of approximately 2.7 g/cm$^3$. According to the present invention, the torsion beam 110 is formed using a steel metal and the trailing arm 140 is formed using aluminum, thereby improving durability while reducing the overall weight.

Therefore, in the rear suspension mounting structure for an electric vehicle according to the present invention, the driving force generated in the input side, i.e., the motor 120, is transferred to the output side, i.e., wheels (not shown), in sequence through an driving speed reducer 150, the driving shaft (not shown), and the hub 170.

Although the rear suspension mounting structure for an electric vehicle according to a preferred embodiment of the present invention has been described for illustrative purposes, those skilled in the art will appreciate that various modifications, additions and substitutions are possible, without departing from the scope and spirit of the invention as disclosed in the accompanying claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A rear suspension mounting structure for an electric vehicle based on a coupled torsion beam axle (CTBA) method, comprising:
   a hub fastened to a center of a wheel to be rotatable;
   a trailing arm including a housing producing an internal space and an arm bush extending to one side of the housing and coupled to a vehicle body;

a torsion beam bolt-coupled to the arm bush through a coupling plate;

a motor coupled to the internal space of the housing and supplying a driving force;

a motor cover provided in the internal space of the housing and sealing the motor from an outside of the housing; and a driving speed reducer provided at an outside of the motor cover in the internal space of the housing, coupled to the hub and reducing an output driving speed in a constant gear ratio, wherein the torsion beam and the trailing arm are formed using dissimilar metals.

2. The rear suspension mounting structure of claim 1, wherein the torsion beam is made of a steel metal.

3. The rear suspension mounting structure of claim 1, wherein the trailing arm is made of aluminum.

4. The rear suspension mounting structure of claim 1, wherein the coupling plate and the torsion beam are made of steel metals.

5. The rear suspension mounting structure of claim 1, wherein the coupling plate has a fastening groove formed therein, the fastening groove shaped to correspond to an end of the torsion beam.

6. The rear suspension mounting structure of claim 5, wherein the torsion beam is fitted into the fastening groove to be fastened.

7. The rear suspension mounting structure of claim 5, wherein a contact region between the fastening groove and the torsion beam is fastened by welding.

8. The rear suspension mounting structure of claim 1, wherein the coupling plate is shaped of a planar plate.

9. The rear suspension mounting structure of claim 1, wherein a plurality of through holes are formed in the coupling plate, a plurality of coupling holes corresponding to the plurality of through holes are formed in one side surface of the arm bush to which the coupling plate is attached, and bolts penetrating the through holes and the coupling holes are engaged with nuts from an other side surface of the arm bush.

10. The rear suspension mounting structure of claim 9, wherein the coupling holes have same horizontally sectional shapes as the nuts.

11. The rear suspension mounting structure of claim 9, wherein the nuts are engaged with the bolts within the coupling holes.

12. The rear suspension mounting structure of claim 9, wherein the coupling plate has a fastening groove formed therein, the fastening groove shaped to correspond to an end of the torsion beam.

13. The rear suspension mounting structure of claim 12, wherein the torsion beam is fitted into the fastening groove to be fastened.

14. The rear suspension mounting structure of claim 12, wherein a contact region between the fastening groove and the torsion beam is fastened by welding.

15. The rear suspension mounting structure of claim 12, wherein the coupling plate is shaped of a planar plate.

16. The rear suspension mounting structure of claim 1, wherein the housing and the arm bush are integrally formed with each other.

17. The rear suspension mounting structure of claim 1, wherein a cover is installed at an exterior side of the housing in a direction in which the motor is coupled into the housing.

18. The rear suspension mounting structure of claim 1, wherein a vertically sectional shape of the arm bush of the trailing arm is "I" shaped.

19. The rear suspension mounting structure of claim 1, wherein a vertically sectional shape of the arm bush of the trailing arm is "H" shaped.

20. The rear suspension mounting structure of claim 1, wherein a surface on which the arm bush and the coupling plate are fastened with each other is hermetically sealed.

* * * * *